United States Patent
Matei et al.

(10) Patent No.: US 12,432,007 B2
(45) Date of Patent: Sep. 30, 2025

(54) SYSTEM AND METHOD FOR SYMBOL DECODING IN HIGH FREQUENCY (HF) COMMUNICATION CHANNELS

(71) Applicant: Palo Alto Research Center Incorporated, Palo Alto, CA (US)

(72) Inventors: Ion Matei, Mountain View, CA (US); Johan de Kleer, Los Altos, CA (US)

(73) Assignee: Xerox Corporation, Norwalk, CT (US)

( * ) Notice: Subject to any disclaimer, the term of this patent is extended or adjusted under 35 U.S.C. 154(b) by 451 days.

(21) Appl. No.: 17/963,894

(22) Filed: Oct. 11, 2022

(65) Prior Publication Data

US 2024/0129059 A1 Apr. 18, 2024

(51) Int. Cl.
*H04L 1/00* (2006.01)
*G06N 3/045* (2023.01)
*G06N 3/088* (2023.01)

(52) U.S. Cl.
CPC .......... *H04L 1/0009* (2013.01); *G06N 3/045* (2023.01); *G06N 3/088* (2013.01); *H04L 1/0036* (2013.01)

(58) Field of Classification Search
CPC ...... H04L 1/0009; H04L 1/0036; G06N 3/045
See application file for complete search history.

(56) References Cited

U.S. PATENT DOCUMENTS

| | | | |
|---|---|---|---|
| 12,045,726 B2 * | 7/2024 | West | G06N 3/045 |
| 12,200,660 B2 * | 1/2025 | Behboodi | G01S 5/0278 |
| 2019/0188565 A1 * | 6/2019 | O'Shea | H04L 1/0036 |
| 2021/0266875 A1 * | 8/2021 | Namgoong | H04W 84/02 |
| 2023/0078971 A1 * | 3/2023 | Babich | H04L 1/0046 370/216 |
| 2024/0195524 A1 * | 6/2024 | Matei | H04L 1/004 |

* cited by examiner

*Primary Examiner* — Khai M Nguyen

(57) ABSTRACT

One embodiment provides a method and a system for reconstructing symbols transmitted over a high frequency (HF) communication channel. During operation, the system can receive, at a receiver, a radio frequency (RF) signal carrying an input data frame and transmitted over the HF communication channel. The input data frame includes a number of known symbols followed by a number of unknown symbols. The system can determine a set of channel parameters associated with the HF communication channel based on the received RF signal and the known symbols and reconstruct, using a machine-learning technique, the unknown symbols based on the determined channel parameters and the received RF signal.

18 Claims, 13 Drawing Sheets

Algorithm 1 Online encoder/decoder adaptation for each data frame do $p(t+1) = p(t) - \delta \nabla_p L_c(p(t))$  ▷ Update the channel parameters $\alpha(t+1) = \alpha(t) - \delta \nabla_\alpha L_{ed}(\alpha(t), \beta(t), p(t))$  ▷ Update the encoder parameters $\beta(t+1) = \beta(t) - \delta \nabla_\beta L_{ed}(\alpha(t), \beta(t), p(t))$  ▷ Update the decoder parameters end for

FIG. 4

Algorithm 2 Encoder and multi-model training
---
Input: number of iterations, mini-batch size
$n \leftarrow 1$
while $n \leq$ number of iterations do
　Generate an input codeword mini-batch
　Generate channel parameters
　Assign the channel parameters to a cluster $i$, based on the distance between the generated Rx signal and the center of the clusters
　$\alpha \leftarrow \alpha - \delta \nabla_\alpha L(\alpha, \beta_i; \text{mini-batch})$　　▷ Update the encoder parameters
　$\beta_i \leftarrow \beta_i - \delta \nabla_{\beta_i} L(\alpha, \beta_i; \text{mini-batch})$　▷ Update the decoder corresponding to mode $i$
　$n \leftarrow n+1$
end while

FIG. 7

SYSTEM AND METHOD FOR SYMBOL DECODING IN HIGH FREQUENCY (HF) COMMUNICATION CHANNELS

BACKGROUND

Field

This disclosure is generally related to high frequency (HF) communication channels. More specifically, this disclosure is related to encoding/decoding symbols transmitted over HF communication channels using machine-learning techniques.

RELATED ART

High frequency (HF) band refers to the frequency range between 3 and 30 megahertz. HF band is widely used in long-distance communications, such as military communications, aviation air-to-ground communications, maritime sea-to-shore and ship-to-ship communications, etc. The dominant means of signal transmission in the HF band is skywave propagation, in which radio waves directed at an angle into the sky refract back from layers of ionized atoms in the ionosphere. Skywave propagation can allow HF radio waves to travel beyond the horizon, around the curve of the Earth, and be received at intercontinental distances using low cost and simplified infrastructure.

Due to the changing conditions of the ionosphere (which can be significantly affected by activities of the sun such as solar storms), the HF channel can be time varying, with large delay spread and frequency selective fading. HF communications can be noisy with high bit error rates.

SUMMARY

One embodiment provides a method and a system for reconstructing symbols transmitted over a high frequency (HF) communication channel. During operation, the system can receive, at a receiver, a radio frequency (RF) signal encoded based on an input data frame and transmitted over the HF communication channel. The input data frame includes a number of known symbols followed by a number of unknown symbols. The system can determine a set of channel parameters associated with the HF communication channel based on the received RF signal and the known symbols and reconstruct, using a machine-learning technique, the unknown symbols based on the determined channel parameters and the received RF signal.

In a variation on this embodiment, determining the channel parameters can include performing a gradient-based optimization operation based on a loss function indicating a difference between a response of the HF communication channel to the known symbols and a response of a model of the HF communication channel with the determined channel parameters to the known symbols.

In a variation on this embodiment, reconstructing the unknown symbols can include using the machine-learning technique to optimize parameters of a decoder and reconstructing the unknown symbols using the decoder with the optimized parameters.

In a further variation, reconstructing the unknown symbols can further include performing offline training of a number of decoder models, with each trained decoder model corresponding to a unique mode of the HF communication channel; determining, based on the received RF signal, a current mode of the HF communication channel; and selecting, from the trained decoder models, a trained decoder model corresponding to the current mode of the HF communication channel. Optimizing the parameters of the decoder can include updating the parameters of the decoder according to corresponding parameters of the selected trained decoder model.

In a further variation, determining the current mode of the HF communication channel can include applying a cluster-analysis technique on the received RF signal.

In a further variation, determining the current mode of the HF communication channel can include decoding, in parallel, the received RF signal using the trained decoder models to obtain a plurality of decoded data frames, and comparing bit error rates (BERs) of the plurality of decoded data frames based on the known symbols in the input data frame, In a further variation, optimizing the parameters of the decoder can include performing a gradient-based optimization operation based on a cross-entropy loss function.

In a further variation, the parameters of the decoder are optimized jointly with parameters of a corresponding encoder that encodes the input data frame.

In a variation on this embodiment, reconstructing the unknown symbols can include solving an integer programing problem to directly predict the unknown symbols.

In a further variation, solving the integer programing problem can include solving a relaxed integer programing problem by allowing the predicted unknown symbols to have continuous values and rounding up the predicted unknown symbols with continuous values to nearest integers.

BRIEF DESCRIPTION OF THE FIGURES

FIG. 4 illustrates exemplary pseudo codes for online updating of the encoder and decoder parameters, according to one embodiment.

FIG. 7 illustrates exemplary pseudo codes for offline training of the encoder and decoder models for different channel modes, according to one embodiment.

In the figures, like reference numerals refer to the same figure elements.

DETAILED DESCRIPTION

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

Embodiments described herein provide a system and method for designing and training machine-learning models used for encoding/decoding signals transmitted through a high frequency (HF) channel in order to improve the performance of the HF communication system. The HF channel can be modeled according to a Waterson model and the channel parameters can be estimated based on known pilot symbols or bits included in transmitted data frames. The estimated channel parameters can facilitate the update of parameters of an encoder model and a decoder model, with each model being a neural network. To reduce the computational cost resulting from the constant updating of the encoder/decoder model parameters, an alternative approach uses a cluster-analysis technique to cluster the channel behaviors (i.e., how the channel states affect the transmitted RF signals) into multiple clusters, with each cluster representing a mode of operation of the channel. Offline training of the encoder/decoder model can be performed for each channel mode. At runtime, the channel mode can be determined, and a corresponding pre-trained decoder model can be selected to perform the decoding operation. In a different approach, instead of learning the parameters of a decoder, a machine-learning model can also be trained to learn the transmitted symbols directly.

Machine-Learning Based Encoder/Decoder for HF Communication

Figure 1:
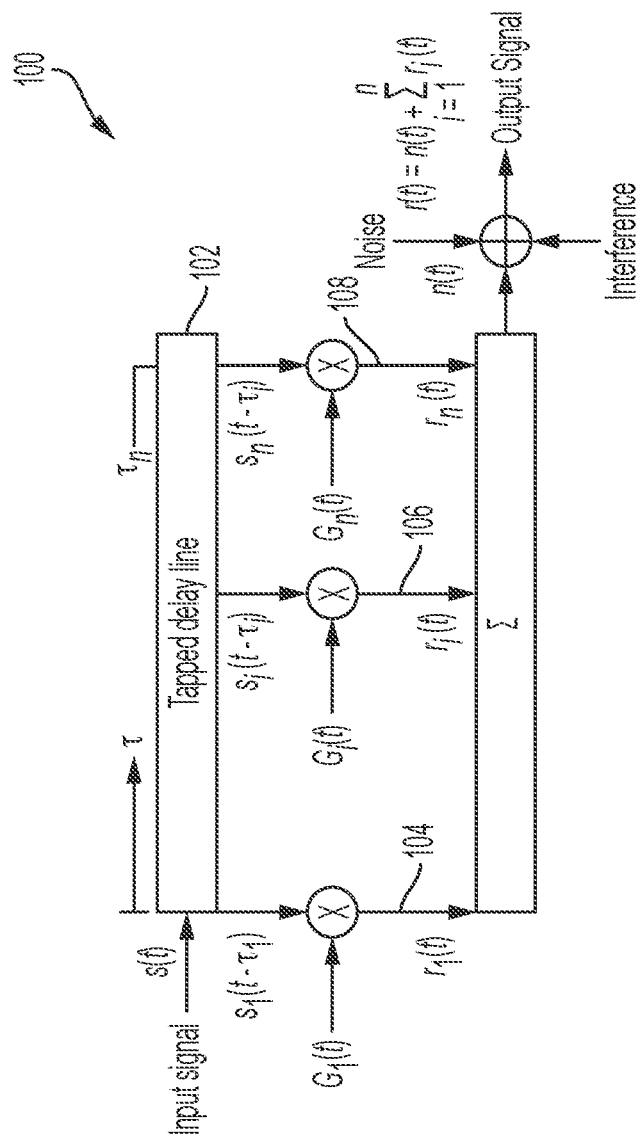
FIG. 1 illustrates an exemplary Watterson channel model of a high frequency (HF) channel, according to one embodiment.

In HF ionospheric communications, the transmitted signal can bounce off several times from the different layers of the ionosphere, which results in several propagation paths. In some embodiments of the instant application, the HF channel can be modeled according to a Watterson channel model that includes a tapped delay line, with each tap corresponding to a resolvable propagation path. FIG. 1 illustrates the Watterson channel model of a high frequency (HF) channel, according to one embodiment. In FIG. 1, an HF channel 100 includes a taped delay line 102 with a number of taps (e.g., taps 104, 106, and 108), and each tap can correspond to an ionosphere layer. At the input of channel 100, a data frame comprising a sequence of symbols (i.e., binary bits of 0s and 1s) can be encoded into an input RF signal s(t). The input signal can pass through tapped delay line 102 with a series taps (e.g., taps 104, 106, and 110). At each tap, the signal can suffer delay (e.g., delay $\tau_i$ at the $i_{th}$ tap) and attenuation (e.g., attenuation $G_i(t)$ at the $i_{th}$ tap), and the signal's frequency spectrum can be affected by a Doppler shift. At the output of channel 100, signals received on each tap (e.g., $r_i(t)$ at the $i_{th}$ tap) are summed up with an additive noise n(t) being applied to the summation. In the example shown in FIG. 1, the output signal can be expressed as $$r(t) = n(t) + \sum_{i=1}^{n} r_i(t).$$

Figure 2:
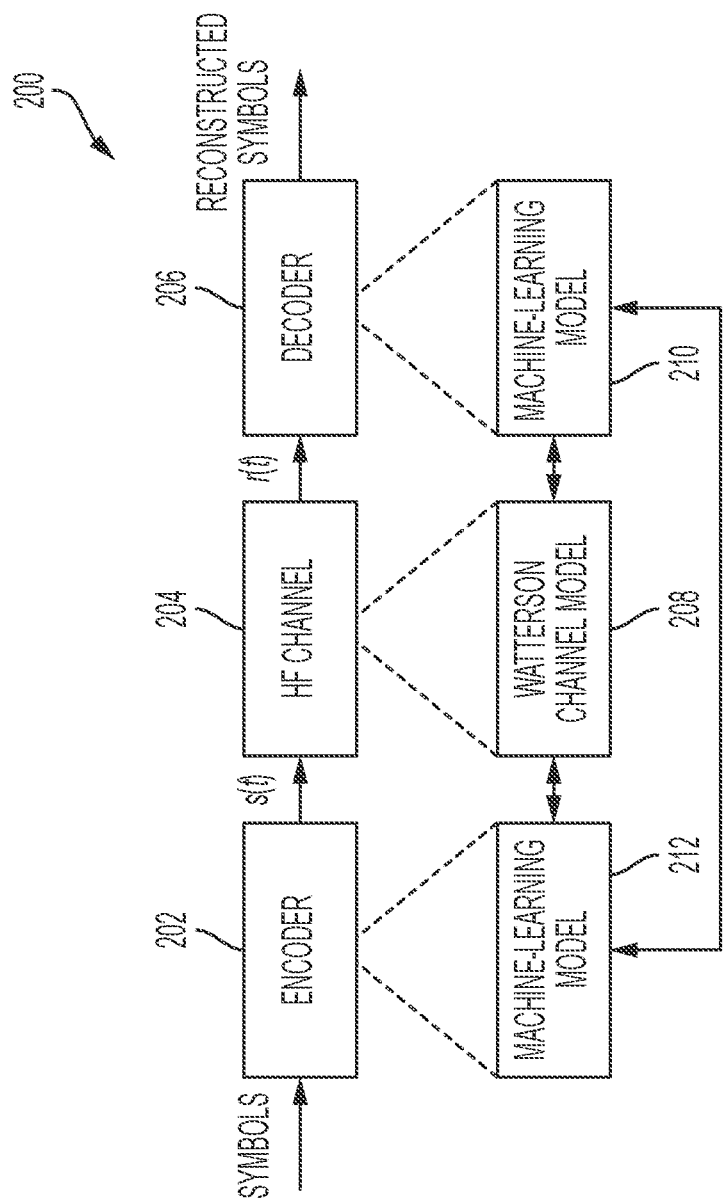
FIG. 2 illustrates an exemplary HF communication system, according to one embodiment.

FIG. 2 illustrates an exemplary HF communication system, according to one embodiment. HF communication system 200 can include an encoder 202, an HF channel 204, and a decoder 206. Encoder 202 can be part of an RF signal transmitter and can encode digital data (e.g., a sequence of binary symbols) into an amplitude-, phase-, or frequency-modulated signal s(t), which is transmitted over HF channel 204. In some embodiments, encoder 202 can implement a quadrature amplitude modulation (QAM)-encoding and orthogonal frequency-division multiplexing (OFDM)-modulation scheme to generate a time-domain signal s(t), which is transmitted over HF channel 204. As signal s(t) propagates through HF channel 204, it may experience time-varying multipath delays, attenuations, and Doppler shifts, as demonstrated in FIG. 1. The output signal of HF channel 204 (i.e., r(t)) is received by an RF receiver that includes decoder 206, which then applies an appropriate decoding scheme on the received RF signal to reconstruct the symbols. The decoding operation performed by decoder 206 is typically the inverse operation of the encoding operation performed by encoder 202. In addition, due to the degradation of signal s(t) in HF channel 204, the decoding operation performed by decoder 206 can be designed to compensate for the signal degradation (e.g., by performing channel equalization) in order to reduce errors in the reconstructed symbols. Using the QAM-encoded and OFDM-modulated signal as an example, if the HF channel is particularly lossy at one or more OFDM subcarrier frequencies, decoder 206 can increase the gains of the received signal at those subcarrier frequencies. Compared with other types of time-varying communication channels, the channel parameters of an HF channel may vary over a relatively large range, and conventional decoding operations implementing a simple channel-equalization scheme may not work well for the HF channel. Conventional decoders may result in high bit error rates (BERs) at the receiver of a HF communication system.

To improve the performance of the HF communication system (e.g., to lower the BER without increasing the signal-to-noise ratio (SNR)), in some embodiments, decoder 206 can implement a machine-learning model 210 that can interact with a channel model (e.g., a Watterson channel model) 208 to learn or predict the decoder parameters that can optimize the BER of the reconstructed symbols under the instant channel condition. The learned decoder parameters can be used to dynamically update the physical parameters (e.g., gains, modulation depths, etc.) of decoder 206 such that decoder 206 can perform the decoding operation using the updated parameters. For example, the parameters of decoder 206 can be updated to compensate for the non-uniform frequency response or multipath delay of HF channel 204. In addition to dynamically updating the decoder parameters, in alternative embodiments, encoder 202 can also implement a machine-learning model 212 that can interact with channel model 208 and decoder machine-learning model 210 to learn or predict various encoder parameters (e.g., gains, modulation depths, etc.) that can pre-distort a transmitted signal in order to optimize the BER of the reconstructed symbols. The learned encoder parameters can be used to dynamically update the operating parameters of encoder 202.

In FIG. 2, only one-way communication performed by HF-communication system 200 is shown. In practical scenarios, HF communication system 200 can perform two-way communications, and HF communication system 200 can include a transceiver (i.e., a transmitter and a receiver) on each side of HF channel 204.

Figure 3:
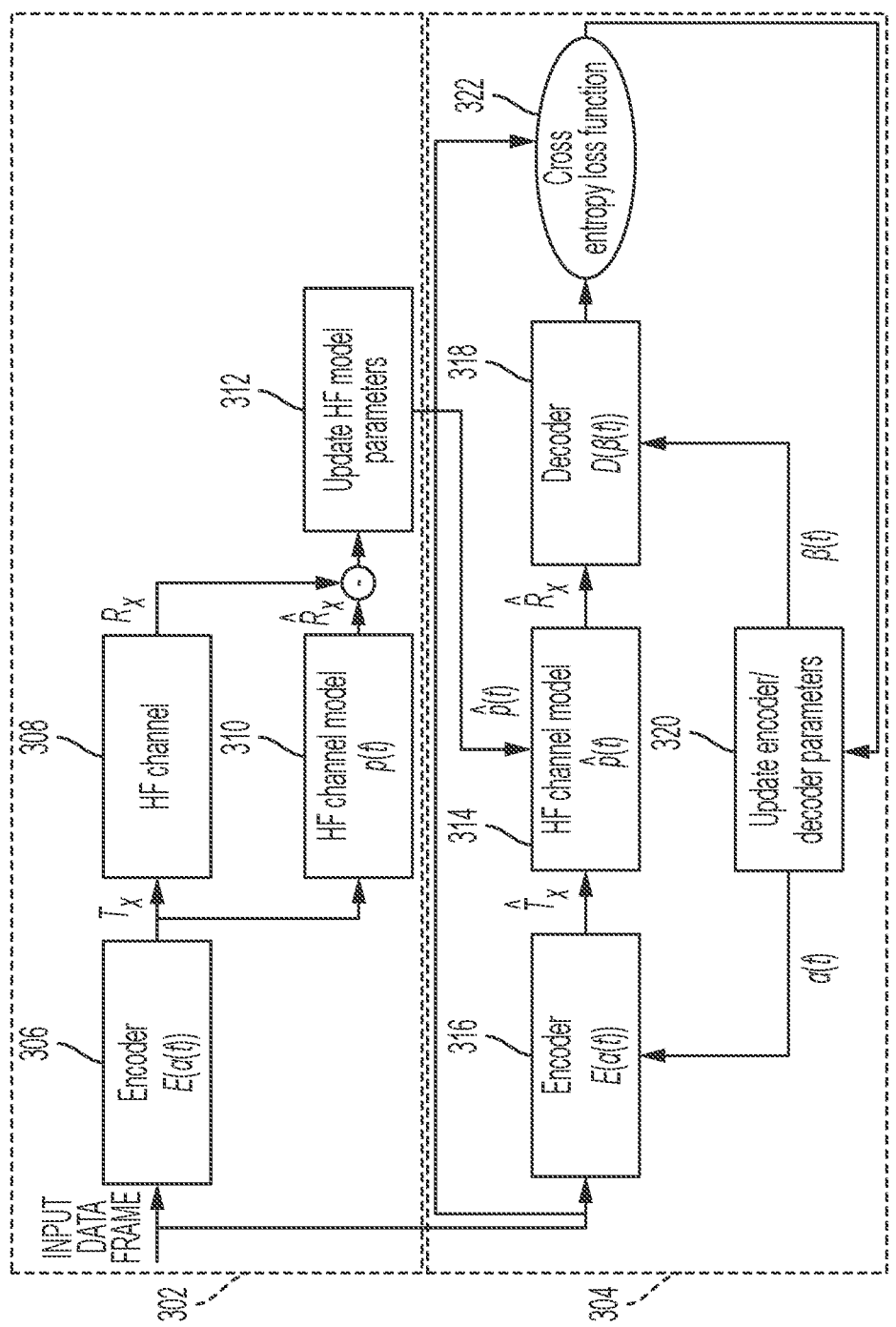
FIG. 3 illustrates an exemplary approach for online learning of encoder/decoder parameters for HF communication, according to one embodiment.

FIG. 3 illustrates an exemplary approach for online learning of encoder/decoder parameters for HF communication, according to one embodiment. More specifically, FIG. 3 illustrates two optimization processes, one being a channel-parameter-estimation process 302 and the other being an encoder/decoder-parameter-estimation process 304.

During channel-parameter-estimation process 302, an input data frame (which can include a sequence of binary bits or symbols) is sent to an encoder 306, modeled as $E(\alpha(t))$, where $\alpha(t)$ represents the time-varying encoder parameters. The length of the input data frame and the encoding function $E(\alpha(t))$ depend on the type of encoding scheme implemented by encoder 306. The output of encoder 306 (which can be a time-domain signal) can be sent to an HF channel 308 as well as an HF channel model 310 (modeled as p(t)) that models HF channel 308. Given a known input $T_x$ (which corresponds to the known portion of the input data frame, such as pilot bits or symbols), the output of HF channel 208 (denoted $R_x$) and the output of HF channel model 310 (denoted $\hat{R}_x$) can be compared, and the model parameters of HF channel model 310 (i.e., p(t)) can be updated by an operation 312 (which updates the HF model parameters). In some embodiments, HF-model-parameter-update operation 312 can use a gradient-based update scheme to update the model parameters. More particularly, performing the gradient-based update scheme can include minimizing a loss function $L_c(p)=\|R_x-\hat{R}_x(p)\|^2$, where $R_x$ is the part of the received signal corresponding to known input $T_x$, and $\hat{R}_x$ is the model predicted part of the received signal corresponding to known input $T_x$. By minimizing this loss function (i.e., by minimizing the difference between the model predicted output and the actual output of the HF channel), parameters of HF channel model 310 can be estimated.

The estimated parameters of the HF channel can be used in encoder/decoder-parameter-estimation process 304, with the estimated channel parameters used to generate an updated HF channel model 314 (denoted p(t)). In encoder/decoder-parameter-optimization process 304, parameters of an encoder 316 (which can be the same as encoder 306 and modeled as $E(\alpha(t))$) and a decoder 318 (modeled as $D(\beta(t))$, where $\beta(t)$ represents time-varying decoder parameters) can also be updated using an operation 320 that updates the encoder/decoder parameters. (i.e., $\alpha(t)$ and $\beta(t)$).

In some embodiments, encoder 316 and decoder 318 can each implement a machine-learning model, such as a deep-learning neural network (NN), with the model parameters being $\alpha(t)$ and $\beta(t)$. The decoder neural network can take the received RF signals as input and output the reconstructed symbols. In one embodiment, an exemplary encoder or decoder neural network can include at least one hidden layer with 48 neurons and one or more activation layers, which use Rectified Linear Unit (ReLU) as the activation function at each node. The machine-learning models can be trained online (or during runtime) using pilot bits or symbols (i.e., known bits or symbols) included in each data frame. Training the machine-learning models can include updating the encoder and decoder parameters (i.e., $\alpha(t)$ and $\beta(t)$) using an operation 320, during which a cross entropy loss function 322 is minimized. In one embodiment, the encoder and decoder parameters can be updated using a gradient-based optimization scheme, such as the Adaptive Moment Estimation (ADAM) algorithm.

Cross-entropy loss function 322 can be defined as $L_{ed}(\alpha, \beta, p)=-\Sigma_i(y_i \log_2 \hat{y}_i+(1-y_i)\log_2 (1-\hat{y}_i))$, where $y_i$ represents symbols inputted to encoder 316 and $\hat{y}_i$ represents symbols reconstructed by decoder 318. Note that decoder 318 reconstructs the symbols based on the decoder model (e.g., $D(\beta(t))$, where model parameters $\beta(t)$ can be updated in real time for each incoming data frame. Similarly, HF channel model 314 may also have its model parameters updated in real time for each incoming data frame.

FIG. 4 illustrates exemplary pseudo codes for online updating of the encoder and decoder parameters, according to one embodiment. More specifically, the algorithm shown in FIG. 4 includes the step of updating the HF channel parameters, the step of updating the encoder parameters, and the step of updating the decoder parameters. When updating the channel parameters for the channel model, a gradient-based optimization scheme (e.g., stochastic gradient descent (SGD), ADAM, etc.) can be applied based on loss function $L_c(p)=\|R_x-\hat{R}_x(p)\|^2$. FIG. 4 also shows that the encoder and the decoder models are jointly trained or updated, because the cross-entropy loss function $L_{ed}(\alpha(t), \beta(t), p(t))$ depends on both the encoder parameters and the decoder parameters. In some embodiments, the encoder and decoder machine-learning models (e.g., neural networks) can be trained (or have their parameters updated) using a gradient-based scheme (e.g., SGD or ADAM).

Updating the parameters of the encoder and the decoder jointly can be advantageous in terms of improving the overall performance of the HF communication system, such as minimizing the BER at the receiver. However, it may not always be practical to achieve the joint training of the encoder and the decoder models. To adaptively update the encoder parameters, the transmitter needs to have knowledge of the condition of the HF channel. However, the HF channel parameters are estimated at the receiver based on the decoded pilot symbols. This would require the two-way communication channel for sending the HF channel parameters to the transmitter, and such a requirement may not be practical in many situations. In alternative embodiments, instead of using an adaptive encoder where the encoder parameters are updated jointly with the decoder parameters, the transmitter can use a fixed encoder (e.g., an encoder implementing the standard QAM-encoding and OFDM-modulation scheme with fixed parameters) to encode all data frames. In other words, the encoder parameters may be selected or optimized based on a certain channel condition (e.g., the average condition of the HF channel over a predetermined time period) but will not be updated when the channel condition changes. The decoder parameters will be learned in real time based on both the encoder parameters and the instant channel condition. As the channel condition changes, only the decoder parameters will be updated.

In the exemplary algorithm shown in FIG. 4, the encoder/decoder parameters are updated for each incoming data frame, which can include a predetermined number of symbols. Updating (or optimizing) the decoder and optionally the encoder parameters for each input data frame can be computationally expensive. To reduce the computation cost, in some embodiments, a batch-execution scheme can be used, where the gradient of the cost function is computed for multiple (e.g., up to 10) data frames, and the encoder/decoder parameters can be updated after the transmission of the multiple data frames.

To further reduce the computation cost, in some embodiments, instead of continuously updating the decoder parameters, the system can use a machine-learning technique to cluster the HF channel behaviors (i.e., how does the channel state affect an input signal) into a limited number of clusters or modes and perform offline training to obtain a number of encoder/decoder models or modes corresponding to the limited number of modes of the HF channel. In other words, instead of having different encoder/decoder parameters for different channel behaviors, similar channel behaviors can be grouped together as one channel mode, and a corresponding encoder/decoder model can be trained for each channel mode. More particularly, all trainings can be performed offline, including the training of a machine-learning model for clustering the channel behaviors and the training of the encoder/decoder model for each channel mode.

Figure 5:
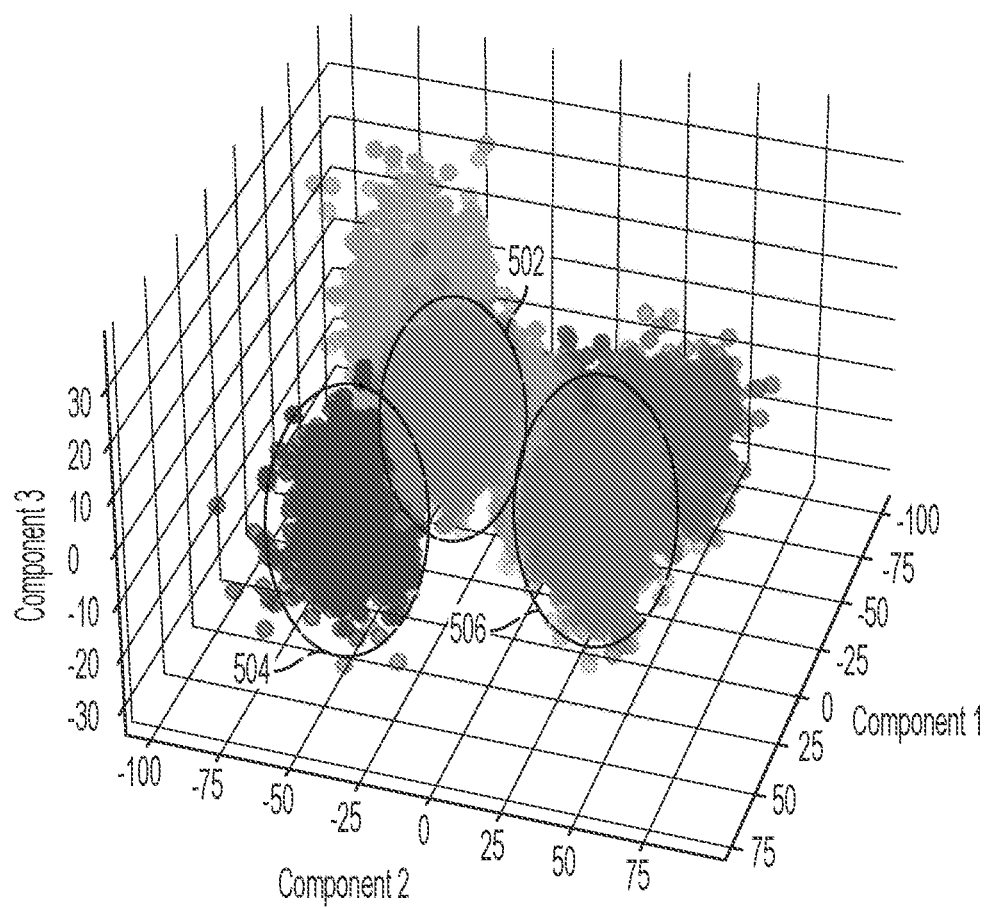
FIG. 5 illustrates an exemplary clustering result of channel behaviors of an HF channel, according to one embodiment.

In some embodiments, a cluster-analysis technique can be used to train a channel-behavior machine-learning model used to cluster the channel behaviors. FIG. 5 illustrates an exemplary clustering result of channel behaviors of an HF channel, according to one embodiment. In this example, an HF channel is modeled using three tapped delay lines, where the delays, gains, and Doppler shifts are randomly chosen from intervals [0 ms, 0.003 ms], [0, 1], and [−2 Hz, 2 Hz], respectively. 250,000 samples are generated, where each sample corresponds to 10 data frames of 192 bits each, and each data frame corresponds to a complex received signal (i.e., $R_x$). By performing a cluster-analysis operation on the received signals, the received signals can be clustered into a number of clusters, such as clusters 502, 504, and 506. Because the received signals are resulted from different channels behaviors, the different clusters of the received signals correspond to different clusters of channel behaviors. To visualize the clusters, in the example shown in FIG. 5, a principal component analysis (PCA) transformation can be applied to the $R_x$ dataset, and three main components are kept after the transformation. Each $R_x$ data point can be plotted as a point in the three-dimensional (3D) space. FIG. 5 shows a clear separation among the different clusters.

For each operation mode of the channel, a decoder model and optionally an encoder model can be trained such that the BER of the symbols reconstructed by the decoder can be reduced or minimized. The training of the decoder and encoder models can also be performed offline using known input data frames.

Figure 6A:
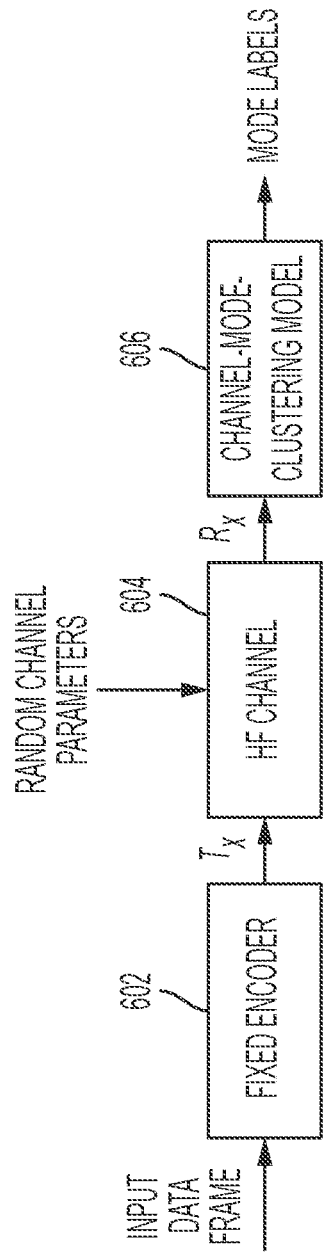
FIG. 6A illustrates an exemplary process for training a channel-mode-clustering model, according to one embodiment.

FIG. 6A illustrates an exemplary process for training a channel-mode-clustering model, according to one embodiment. The training of a channel-mode-clustering model can start with inputting known data frames to a fixed encoder (i.e., an encoder with fixed parameters) 602 and the encoded signal $T_x$ is sent to an HF channel model 604 with randomly generated channel parameters. For example, one set of random channel parameters can be generated for each input data frame or a batch of input data frames. The outputs of the channel model (i.e., $R_x$) are the training samples for training channel-mode-clustering model 606. In some embodiments, the training can be unsupervised, and channel-mode-clustering model 606 can include a k-means neural network (i.e., a neural network implementing the k-means clustering technique). The outputs of channel-mode-clustering model 606 include the mode labels that indicate the operation modes of the HF channel. Each $R_x$ can be assigned a mode label.

Figure 6B:
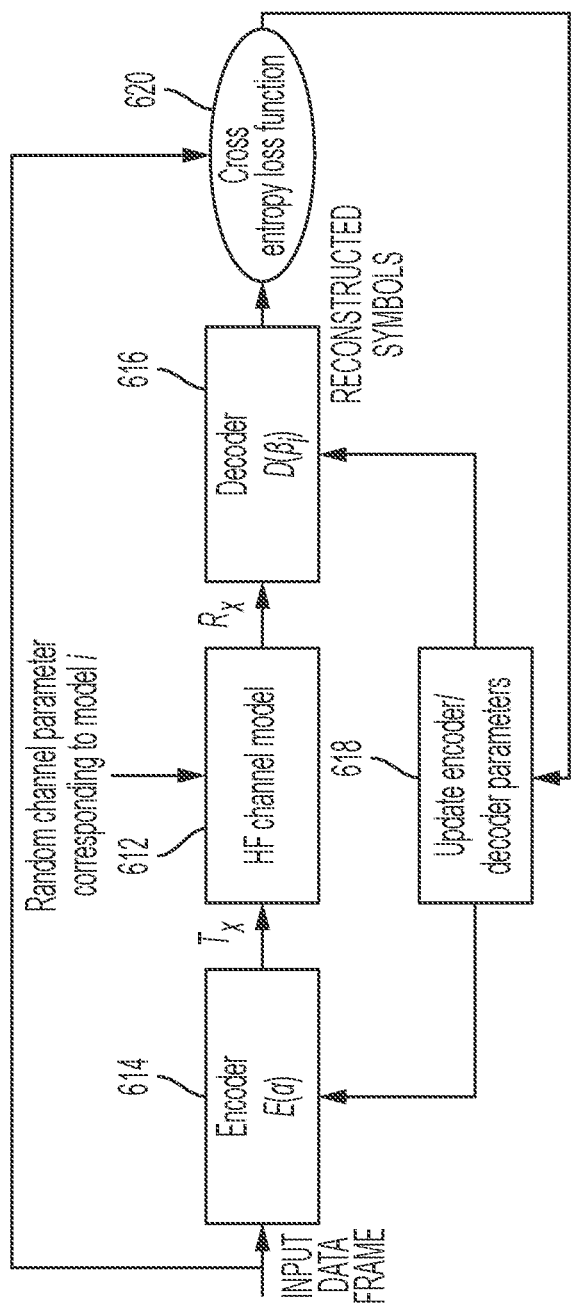
FIG. 6B illustrates an exemplary process for training an encoder/decoder model for a particular channel mode, according to one embodiment.

Once the channel-mode-clustering model is sufficiently trained, it can participate in the training of the encoder/decoder models. FIG. 6B illustrates an exemplary process for training an encoder/decoder model for a particular channel mode, according to one embodiment. During training, an HF channel model 612 can use random channel parameters corresponding to channel mode i to emulate an HF channel operating in mode i. Randomly generated input data frames can be sent to an encoder model 614 (denoted $E(\alpha(t))$) and the encoded signal (i.e., $T_x$) can be sent to HF channel model 612. The output of HF channel model 612 (i.e., $R_x$) can be sent to a decoder model 616 for channel mode i (denoted $D(\beta_i(t))$), and the output of decoder model 616 cam include the decoded or reconstructed symbols.

Encoder model 614 and decoder model 616 can be jointed trained by a training operation 618, which dynamically update the parameters of encoder model 614 and decoder model 616 based on a cross-entropy loss function 620 of the encoded symbols and the reconstructed symbols. The training can be terminated when a sufficient number of input data frames have been used or when the decoder parameters are optimized for channel mode i. The similar training process can be performed for different channel modes. Unlike encoder/decoder-parameter-update process 304 shown in FIG. 3, the training process shown in FIG. 6B can be performed offline using known data frames as training samples. Offline training of the encoder and decoder models can reduce the computation cost of the communication system during runtime.

FIG. 7 illustrates exemplary pseudo codes for offline training of the encoder and decoder models for different channel modes, according to one embodiment. In this example, the encoder and decoder parameters are updated for minibatches of sample data frames, with each minibatch including a randomly selected subset of the sample data frames. The number of iterations can be predetermined. For example, the number of iterations can be determined to ensure that the encoder and decoder models are sufficiently trained. In the example shown in FIG. 7, multiple decoder models or multiple decoder modes can be trained, with each decoder model or decoder mode corresponding to a channel-behavior cluster shown in FIG. 5. For example, within a particular iteration, a set of input data frames or codewords can be selected and a set of random channel parameters can be generated. The channel parameters can be used to update the channel model, which can in turn generate a channel output signal (i.e., $R_x$). The previously trained channel-mode-clustering model can then be used to determine an operation mode of the channel based on the channel output signal $R_x$. Accordingly, the decoder parameters for the corresponding mode (or the corresponding decoder model) can be updated along with the encoder parameters. The multiple decoder models can also be combined as a single decoder model with multiple modes, with each decoder mode corresponding to a channel mode.

During runtime, the channel-mode-clustering model implemented at the receiver can determine the operation mode of the HF channel based on the received signal $R_x$. According to the determined channel mode, the decoder can be configured to operate in a corresponding decoder mode. In other words, the decoder parameters can be updated according to corresponding parameters of a previously trained decoder model for the channel mode.

In alternative embodiments, instead of using the channel-mode-clustering model to determine the operation mode of the channel, the decoder mode can be determined based on the measured BER of the pilot symbols included in the input data frames. More specifically, the receiver can use the different decoder models or modes to decode, in parallel, the received RF signal (i.e., $R_x$), with each decoder model or mode outputting a decoded data frame. The receiver can then compare the BERs of the different decoded data frames based on known pilot symbols. A decoder model or mode outputting a data frame with the smallest BER can then be selected, and the decoder parameters can then be updated according to the selected model or mode to reconstruct symbols.

Figure 8:
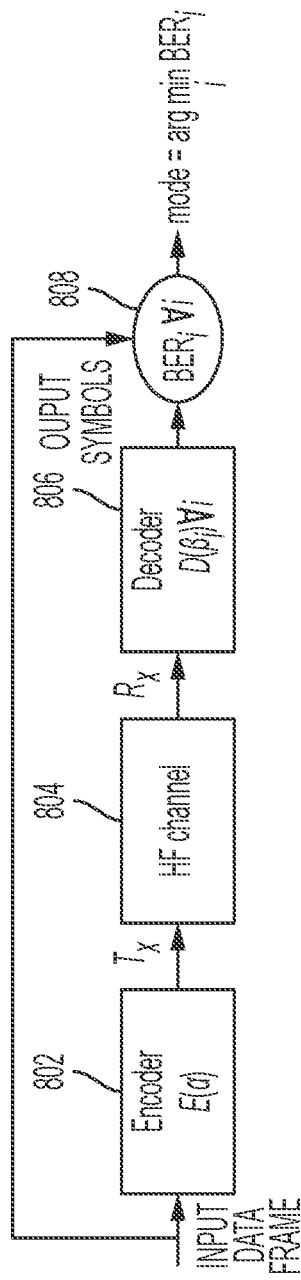
FIG. 8 illustrates an exemplary process for selecting a decoder mode, according to one embodiment.

FIG. 8 illustrates an exemplary process for selecting a decoder mode, according to one embodiment. During runtime, an input data frame can be sent to an encoder 802, which can implement a previously trained encoder model $E(\alpha(t))$. The encoded RF signal (i.e., $T_x$) can be sent, via an HF channel 804, to a decoder 804, which implements a number of decoders models (e.g., $D(\beta_i(t))$, i=1, 2, ..., m), each decoder model corresponding to a channel mode. Decoder 804 decodes the received RF signal (i.e., $R_x$) using different decoder modes or different decoder models. Each decoder mode can generate a decoded data frame. The different decoded data frames can be sent to a BER comparator 808, which computes and compares the BERs for the different decoded data frames based on the known pilot symbols in the input data frame. BER comparator 808 can then output the channel mode based on which decoded data frame has the lowest BER. In other words, if the decoded data frame generated by the ith decoder model has the lowest BER among all decoder models, the selected decoder mode would be the ith mode. Accordingly, symbols reconstructed by decoder 804 according to the ith decoder model would be the output of the receiver. Note that the decoder mode can be selected for each input data frame or for a batch of input data frames.

Figure 9:
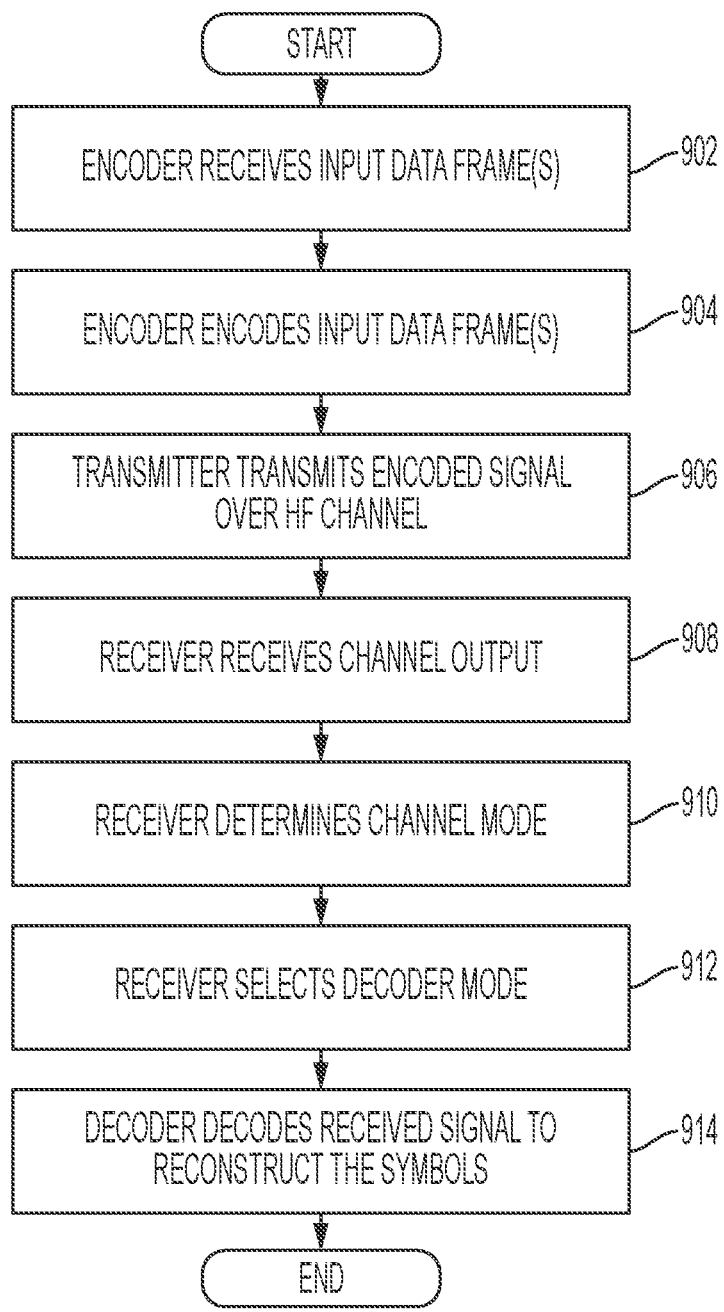
FIG. 9 presents a flowchart illustrating an exemplary runtime operation of the HF communication system, according to one embodiment.

FIG. 9 presents a flowchart illustrating an exemplary runtime operation of the HF communication system, according to one embodiment. During operation, the encoder of an HF communication system can receive an input data frame or a set of input data frames (operation 902). The encoder can encode the input data frame(s) (operation 904). In some embodiments, the encoder can implement a previously trained encoder model, such as an encoder model implementing QAM-encoding and OFDM-modulation with pre-trained model parameters. The encoder model can be trained jointly with a number of decoder models, with each decoder model corresponding to a channel mode.

The transmitter of the HF communication system can transmit the encoded signal over the HF channel (operation 906). The receiver receives the channel output (operation 908) and determines the current mode of the channel (operation 910). The receiver may use different mechanisms to determine the channel mode. In some embodiments, the receiver can apply a previously trained channel-mode-clustering model on the received RF signal to determine the channel mode. In alternative embodiments, the receiver can use a plurality of previously trained decoder models (with each decoder model corresponding to a unique channel mode) to decode the received RF signal in parallel. Based on the known pilot symbols in the input data frame(s), the receiver can determine which decoder model results in the lowest BER of the decoded symbols. The decoder model with the lowest BER corresponds to the channel mode.

The receiver can then select the mode of operation of the decoder based on the channel mode (operation 912). In the situation where BERs are computed for different decoder modes, the decoder mode resulting in the lowest BER will be selected. The decoder then decodes the received signal to reconstruct the transmitted symbols while operating in the selected mode (operation 914). More specifically, the various parameters of the decoder can be updated based on a previously trained decoder model corresponding to the selected decoder mode.

In the previous examples, a decoder can include one or more decoding components (which can include hardware components such as down-converters and modulators) to perform the inverse operations/computations of the encoder. For example, a typical OFDM encoder can include an inverse fast Fourier transform (IFFT) module to transform a data-encoded frequency-domain signal to a time-domain signal, whereas the OFDM decoder can include an FFT module to transform the time-domain signal back to the frequency domain in order to reconstruct the data. The parameters of the corresponding encoding/decoding components can be determined dynamically (e.g., by implementing a machine-learning technique) based on the HF channel condition or behavior. In alternatively embodiments, instead of using the machine-learning technique to learn the encoder/decoder parameters, one can use a machine-learning technique to learn the transmitted symbols directly.

Directly learning the symbols can be done by solving an inverse problem that answers the question of finding a sequence of symbols that when passes through the encoder and the HF channel would result in the measured $R_x$ signal. To be able to learn the transmitted symbols directly, it is assumed that the receiver knows the encoding scheme and the state of the channel (i.e., channel parameters). Note that the state of the channel or channel parameters can be estimated using channel-parameter-estimation process 302 shown in FIG. 3. The receiver performs an optimization operation to learn the symbols, during which the predicted symbols are updated until the predicted $\hat{R}_x$ signal matches the measured $R_x$ signal. The symbol-learning optimization problem can be expressed as:

$$\min_{b_i \in \{0,1\}} \|R_x - \hat{R}_x(b_i)\|^2,$$

where $b_i$ are the bits in the input data frame. In other words, the optimization problem is to find $b_i$ that can minimize the difference between the predicted signal $\hat{R}_x$ and the measured signal $R_x$.

The above optimization problem is an integer programming problem or binary integer programming problem (i.e., $b_i$ can be 0 or 1), and solving such a problem does not scale up with the number of bits. In some embodiments, instead of solving the integer optimization problem, one can solve a relaxed version of the problem by assuming that $b_i$ have continuous values between 0 and 1. After finding the solution (denoted $b^*_i$) of the relaxed problem, one can generate the solution for $b_i$ by rounding up b to the closest integers, i.e., $$b_i = \begin{cases} 1, & b_i^* \geq 0.5 \\ 0, & b_i^* \leq 0.5 \end{cases}.$$

Figure 10:
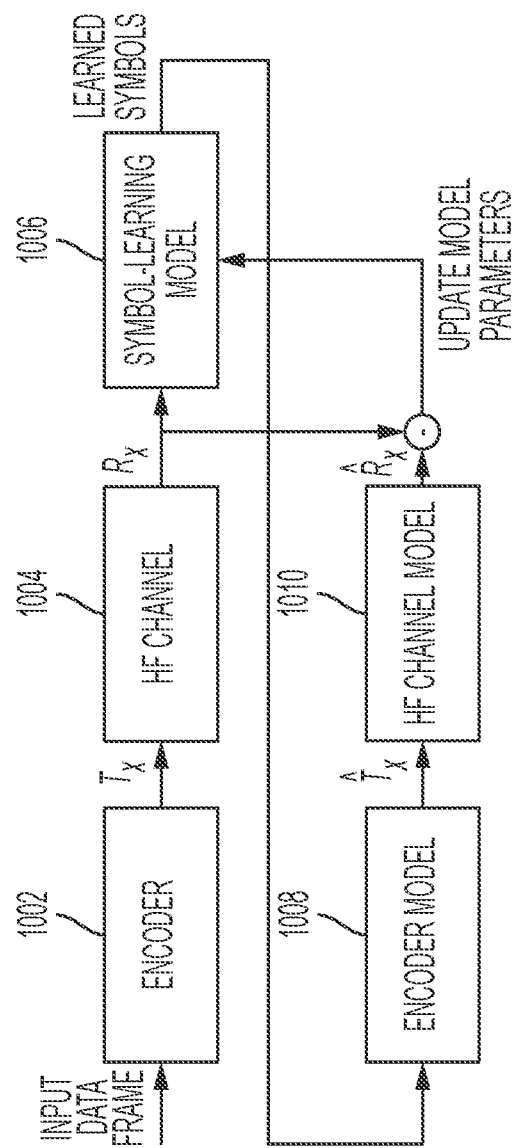
FIG. 10 illustrates an exemplary process for training a symbol-learning model, according to one embodiment.

In some embodiments, a machine-learning model can be trained online using known pilot bits in the input data frames. Once trained, the machine-learning model can take the HF channel output (i.e., $R_x$) as its input and output the learned symbols. FIG. 10 illustrates an exemplary process for training a symbol-learning model, according to one embodiment. During training, known pilot bits of an input data frame can be sent to an encoder 1002 (e.g., a hardware-based encoder), which encodes the input data frame according to a predetermine encoding scheme. The known encoded signal $T_x$ can be sent over an HF channel 1004 to a receiver that implements a symbol-learning model 1006. The output of symbol-learning model 1006 can be sent to an encoder model 1008, which can be a model of hardware-based encoder 1002. The output of encoder model 1008 can be sent to HF channel model 1010, which models HF channel 1004. Note that the channel parameters of HF channel model 1010 can be updated using a process similar to channel-parameter-estimation process 302 shown in FIG. 3. The parameters of symbol-learning model 1006 can be determined or symbol-learning model 1006 can be trained based on the difference between the received channel output (i.e., the output of HF channel 1004) and the predicted channel output (i.e., the output of HF channel model 1010). The trained symbol-learning model can be used to determine/predict the unknown symbols in the input data frame based on the output of the HF channel. In further embodiments, symbol-learning model 1006 can learn the symbols included the input data frame in an unsupervised way, i.e., without the need to use the known symbols as training samples. Learning the symbols can involve solving a corresponding integer programming problem.

Compared with the aforementioned encoder/decoder model updating approach and the cluster-based decoder-mode-selection approach, this direct-symbol-learning approach can result in the lowest BERs for the same signal SNR but may cause the highest computation burden during runtime. On the other hand, although resulting in a slightly higher BER, the cluster-based decoder-mode-selection approach is more computational efficient, because the computation burden happens during the offline training for learning the different decoder models corresponding to the different channel modes, and because its runtime operation only requires forward propagation (i.e., no need to update model parameters). Directly learning the symbols during runtime can be time consuming, especially when a large number of data frames need to be processed. To increase efficiency, a parallel computing approach can be used, where a long sequence of data frames can be divided into a number of groups, with each group having a smaller number of data frames. Multiple symbol-learning processes can be executed in parallel, one process for each group of data frames.

Figure 11:
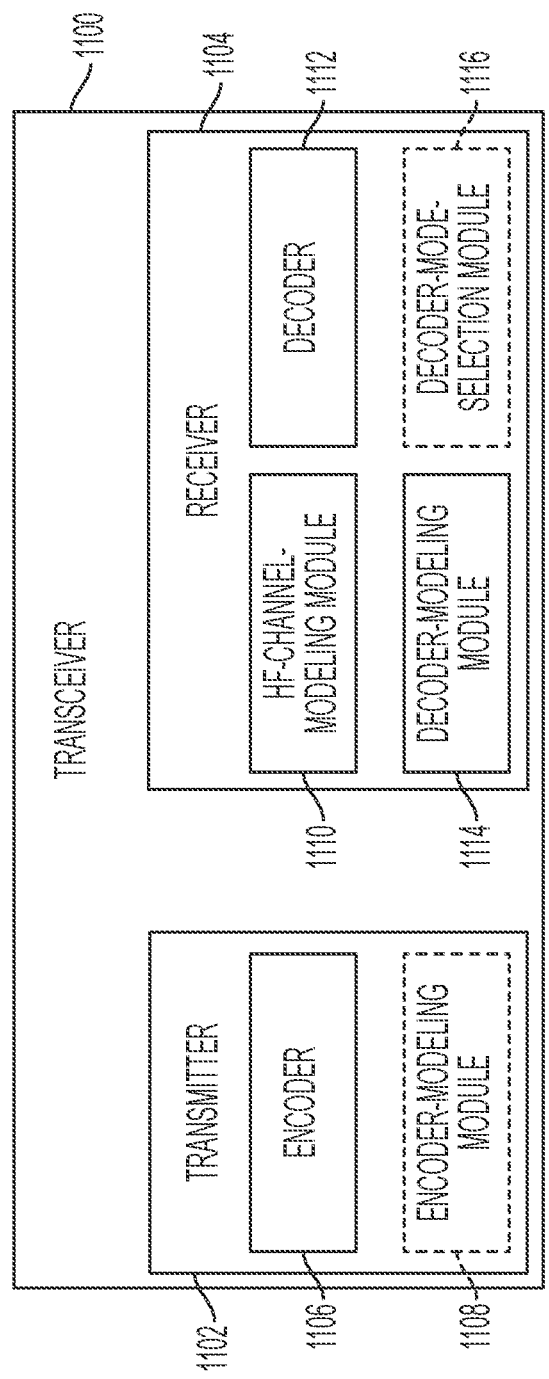
FIG. 11 presents a block diagram of an exemplary transceiver for HF communication, according to one embodiment.

FIG. 11 presents a block diagram of an exemplary transceiver for HF communication, according to one embodiment. Transceiver 1100 can include a transmitter 1102 for transmitting communication signals over an HF channel and a receiver 1104 for receiving communication signals over the HF channel.

Transmitter 1102 can include an encoder 1106 for encoding to-be-transmitted data frames and an optional encoder-modeling module 1108. In some embodiments, encoder 1106 can include various hardware modules (e.g., up-converters, modulators, etc.) used to perform the encoding and modulation operations. Encoder-modeling module 1108 can be responsible for implementing a machine-learning model (e.g., a neural network) that models the behavior of encoder 1106 in order to find optimized parameters of encoder 1106 for different HF channel states. As the state of the HF channel varies over time, encoder-modeling module 1108 can dynamically update the operating parameters of encoder 1106 such that, when the encoded signal is received at a receiver on the other end of the HF channel, the BER of the received signal can be reduced or minimized. Encoder-modeling module 1108 can be optional. In some embodiments, encoder 1106 may have fixed parameters.

Receiver 1104 can include an HF-channel-modeling module 1110, a decoder 1112, a decoder-modeling module 1114, and an optional decoder-mode-selection module 1116. HF-channel-modeling module 1110 can be responsible for modeling the HF channel. In some embodiments, HF-channel-modeling module 1110 can model the HF channel according to a Watterson channel model. During runtime (i.e., when RF signals are received at receiver 1104), based on pilot symbols included the transmitted data frames and the received RF signals, HF-channel-modeling module 1110 can estimate the instant channel parameters. In one embodiment, HF-channel-modeling module 1110 can estimate the channel parameters using a gradient-based optimization technique (e.g., SGD or ADAM). Note that the estimated channel parameters can be sent to a remote transceiver on the other side of the HF channel to facilitate the update of the encoder parameters in the remote transceiver.

Decoder 1112 can be responsible for decoding/reconstructing symbols based on the received RF signals. Decoder-modeling module 1114 can be responsible for implementing a machine-learning model (e.g., a neural network) that can model the behavior of decoder 1112. In some embodiments, decoder 1112 can be a hardware-based decoder that includes various decoder components (e.g., down-converters, modulators, etc.) for performing the inverse operations of encoder 1106, and decoder-modeling module 1114 can implement a neural network that can model the behavior of decoder 1112 in order to find the optimized operating parameters of decoder 1112 for different HF channel states. In an alternative embodiment, decoder 1112 can be a software-based symbol-reconstruction module that does not include the various decoder components but can implement a machine-learning model (e.g., a neural network) configured to directly learn the transmitted symbols from a received RF signal. Decoder-modeling module 1114 can interact with HF-channel-modeling module 1110 to obtain the instant channel parameters.

In an alternative embodiment, decoder-modeling module 1114 can include multiple previously trained decoder models that model the behavior of decoder 1112 in multiple modes, each decoder mode corresponding to a mode of the HF channel. Optional decoder-mode-selection module 1116 can be configured to select a decoder mode based on the received RF signal. In some embodiments, optional decoder-mode-selection module 1116 can use a cluster-analysis technique to cluster received signals and can select a decoder mode based on the cluster to which a received RF signal belongs. Alternatively, optional decoder-mode-selection module 1116 can be configured to select a decoder mode based on the observed BERs of known pilot symbols in transmitted data frame(s) decoded by a number of previously trained decoder models. Decoder 1112 can then be configured to operate in the selected decoder mode (i.e., have its operating parameters updated accordingly) to decode the incoming data frames.

Figure 12:
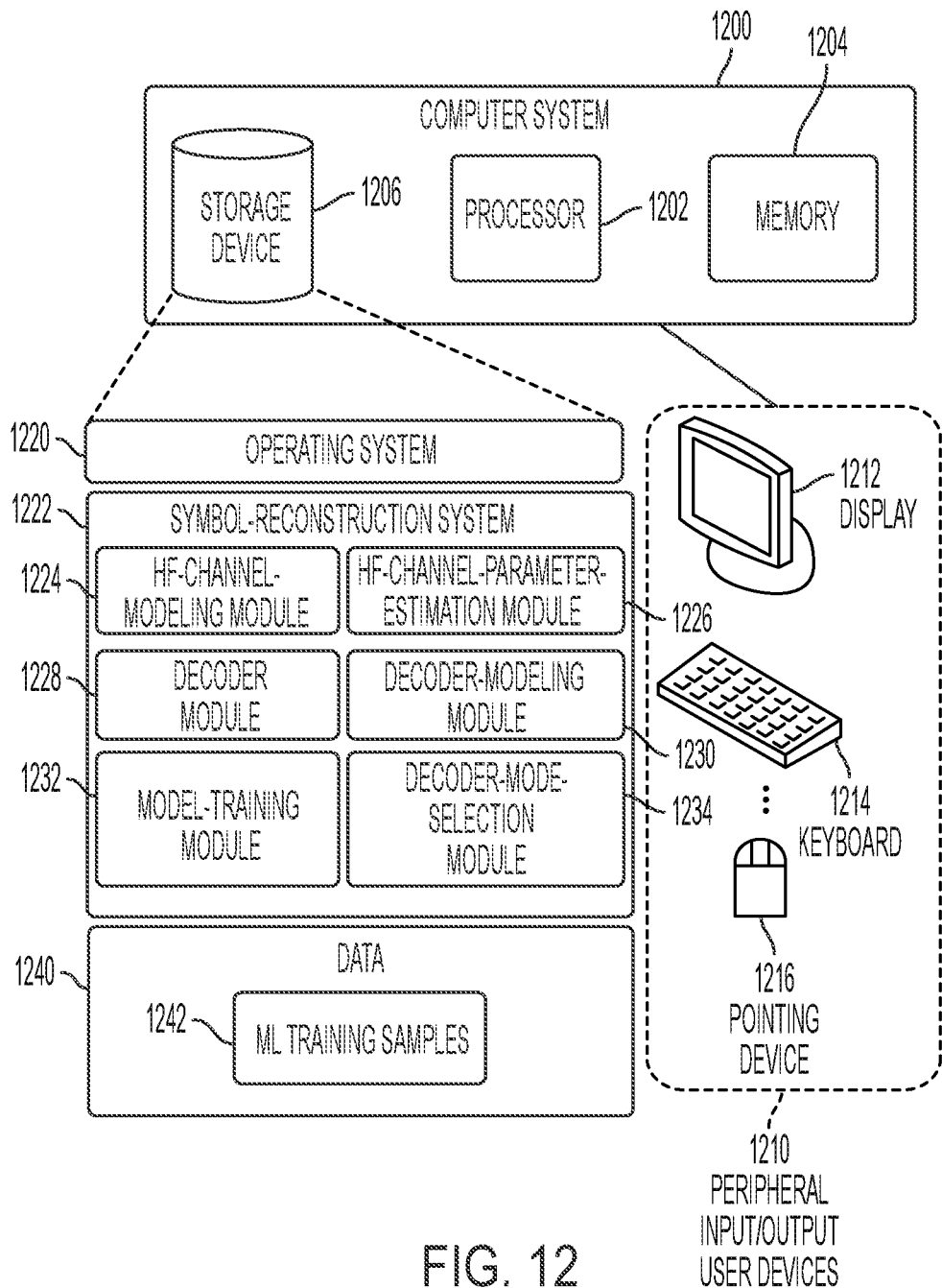
FIG. 12 illustrates an exemplary computer system that facilitates the reconstruction of symbols based on signals received via an HF channel, according to one embodiment.

FIG. 12 illustrates an exemplary computer system that facilitates the reconstruction of symbols based on signals received via an HF channel, according to one embodiment. Computer system 1200 includes a processor 1202, a memory 1204, and a storage device 1206. Furthermore, computer system 1200 can be coupled to peripheral input/output (I/O) user devices 1210, e.g., a display device 1212, a keyboard 1214, and a pointing device 1216. Storage device 1206 can store an operating system 1220, a symbol-reconstruction system 1222, and data 1240.

Symbol-reconstruction system 1222 can include instructions, which when executed by computer system 1200, can cause computer system 1200 or processor 1202 to perform methods and/or processes described in this disclosure. Specifically, symbol-reconstruction system 1222 can include instructions for modeling the HF channel (HF-channel-modeling module 1224), instructions for estimating the HF channel parameters (HF-channel-parameter-estimation module 1226), instructions for implementing a decoder (decoder module 1228), instructions for modeling behaviors of the decoder using one or more neural networks (decoder-modeling module 1230), instructions for training the decoder models (model-training module 1232), and optional instructions for selecting an decoder model among multiple previously trained decoder models (decoder-model-selection module 1234). Data 1240 can include machine-learning (ML) training samples 1242, such as the pilot bits.

In general, the disclosed embodiments provide a system and method that facilitate symbol reconstruction at the receiver of an HF communication system. More specifically, the receiver can implement an HF channel model that models the behavior of the channel. The channel parameters can be determined based on known pilot symbols included in transmitted data frame(s). Moreover, the receiver can include a machine-learning-based symbol-reconstruction module that can use machine-learning techniques to reconstruct transmitted symbols. In some embodiments, the machine-learning-based symbol-reconstruction module can include a hardware-based decoder with various decoding components for performing the inverse operations of the encoder. The hardware-based decoder can be modeled using a neural network that can be trained online during runtime or offline. When trained online, the training samples can be the pilot symbols in each input data frame, and the trained decoder model with updated decoder parameters can be used to decode the unknown symbols in the input data frame. When offline training is used, multiple decoder models can be trained for multiple channel modes. A trained decoder model can be selected based on the instant channel mode, and the decoder can perform the decoding operation using parameters of the trained decoder model. The instant channel mode can be determined by a separate channel-mode-clustering model or by comparing the BERs generated by different decoder models. In alternative embodiments, the machine-learning-based symbol-reconstruction module can include a neural network that can directly learn/reconstruct symbols based on received signals. The neural network can also be trained online using the received signals correspond to known pilot symbols.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for reconstructing symbols transmitted over a high frequency (HF) communication channel, the method comprising:
    receiving, at a receiver, a radio frequency (RF) signal carrying an input data frame and transmitted over the HF communication channel, wherein the input data frame comprises a number of known symbols followed by a number of unknown symbols;
    determining a set of channel parameters associated with the HF communication channel based on the received RF signal and the known symbols; and
    reconstructing, using a machine-learning technique, the unknown symbols based on the determined channel parameters and the received RF signal, wherein the reconstruction comprises:
        determining, based on the received RF signal, a current mode of the HF communication channel;
        selecting, from a plurality of decoder models which are previously trained offline, a decoder model corresponding to the current mode of the HF communication channel; and
        reconstructing the unknown symbols based on the channel parameters and the selected decoder model.

2. The method of claim 1, wherein determining the channel parameters comprises performing a gradient-based optimization operation based on a loss function indicating a difference between a response of the HF communication channel to the known symbols and a response of a model of the HF communication channel with the determined channel parameters to the known symbols.

3. The method of claim 1, wherein reconstructing the unknown symbols further comprises:
    optimizing parameters of a decoder according to corresponding parameters of the selected previously trained decoder model; and
    reconstructing the unknown symbols using the decoder with the optimized parameters.

4. The method of claim 3, wherein optimizing the parameters of the decoder comprises performing a gradient-based optimization operation based on a cross-entropy loss function.

5. The method of claim 4, wherein the parameters of the decoder are optimized jointly with parameters of a corresponding encoder that encodes the input data frame.

6. The method of claim 1, wherein determining the current mode of the HF communication channel comprises applying a cluster-analysis technique on the received signal.

7. The method of claim 1, wherein determining the current mode of the HF communication channel comprises:
    decoding, in parallel, the received RE signal using the trained decoder models to obtain a plurality of decoded data frames; and
    comparing bit error rates (BERs) of the plurality of decoded data frames based on the known symbols in the input data frame.

8. The method of claim 1, wherein reconstructing the unknown symbols comprises solving an integer programing problem to directly predict the unknown symbols.

9. The method of claim 8, wherein solving the integer programing problem comprises:
- solving a relaxed integer programing problem by allowing the predicted unknown symbols to have continuous values; and
- rounding up the predicted unknown symbols with continuous values to nearest integers.

10. A computer system for reconstructing symbols transmitted over a high frequency (HF) communication channel, the computer system comprising:
- a processor; and
- a storage device coupled to the processor and storing instructions, which when executed by the processor cause the processor to perform a method, the method comprising:
  - determining a set of channel parameters associated with the HF communication channel based on a radio frequency (RF) signal received over the HF communication channel, wherein the received RF signal is encoded based on an input data frame comprising a number of known symbols followed by a number of unknown symbols; and
  - reconstructing, using a machine-learning technique, the unknown symbols based on the determined channel parameters and the received RF signal, wherein the reconstruction comprises:
    - determining, based on the received RF signal, a current mode of the HF communication channel;
    - selecting, from a plurality of decoder models which are previously trained offline, a decoder model corresponding to the current mode of the HF communication channel; and
    - reconstructing the unknown symbols based on the channel parameters and the selected decoder model.

11. The computer system of claim 10, wherein determining the channel parameters comprises performing a gradient-based optimization operation based on a loss function indicating a difference between a response of the HF communication channel to the known symbols and a response of a model of the HF communication channel with the determined channel parameters to the known symbols.

12. The computer system of claim 10, wherein reconstructing the unknown symbols further comprises:
- optimizing parameters of a decoder according to corresponding parameters of the selected previously trained decoder model; and
- reconstructing the unknown symbols using the decoder with the optimized parameters.

13. The computer system of claim 12, wherein optimizing the parameters of the decoder comprises performing a gradient-based optimization operation based on a cross-entropy loss function.

14. The computer system of claim 13, wherein the parameters of the decoder are optimized jointly with parameters of a corresponding encoder that encodes the input data frame.

15. The computer system of claim 10, wherein determining the current mode of the HF communication channel comprises applying a cluster-analysis technique on the received signal.

16. The computer system of claim 10, wherein determining the current mode of the HF communication channel comprises:
- decoding, in parallel, the received RF signal using the trained decoder models to obtain a plurality of decoded data frames; and
- comparing bit error rates (BERs) of the plurality of decoded data frames based on the known symbols in the input data frame.

17. The computer system of claim 10, wherein reconstructing the unknown symbols comprises solving an integer programing problem to directly predict the unknown symbols.

18. The computer system of claim 17, wherein solving the integer programing problem comprises:
- solving a relaxed integer programing problem by allowing the predicted unknown symbols to have continuous values; and
- rounding up the predicted unknown symbols with continuous values to nearest integers.

* * * * *